United States Patent [19]

Trenc

[11] 4,129,340
[45] Dec. 12, 1978

[54] CONTROL DEVICE FOR A PNEUMATIC BRAKING SYSTEM

[75] Inventor: Ramon B. Trenc, Barcelona, Spain

[73] Assignee: Bendibercia, S.A., Barcelona, Spain

[21] Appl. No.: 802,932

[22] Filed: Jun. 2, 1977

Related U.S. Application Data

[63] Continuation of Ser. No. 665,368, Mar. 10, 1976, abandoned.

[30] Foreign Application Priority Data

Mar. 13, 1975 [ES] Spain .................................. 435576

[51] Int. Cl.² ............................................. B60T 13/00
[52] U.S. Cl. ................................. 303/6 R; 180/89.11; 303/52
[58] Field of Search ....................................... 303/2-4, 303/7, 6 R, 50, 52, 54, 56, 13, 28, 40; 188/345, 152; 92/62, 65; 91/460; 60/579, 562, 582, 555, 587, 576, 581, 574, 580, 571; 180/89.11, 89.14

[56] References Cited

U.S. PATENT DOCUMENTS

| | | | |
|---|---|---|---|
| 3,117,421 | 1/1964 | Stelzer | 60/562 |
| 3,266,850 | 8/1966 | Herold | 303/52 |
| 3,275,381 | 9/1966 | Pfeifer | 303/7 |
| 3,477,549 | 11/1969 | Barton | 92/65 X |
| 3,618,692 | 11/1971 | Stikeleather | 180/89.14 |

*Primary Examiner*—Trygve M. Blix
*Assistant Examiner*—Douglas C. Butler
*Attorney, Agent, or Firm*—Ken C. Decker; W. N. Antonis

[57] ABSTRACT

A hydraulic control device for a pneumatic brake system, more particularly for use in heavy vehicles. The control device of the hydraulic type is provided between the brake pedal and the pneumatic control valve of the brake circuit, this device comprising a master cylinder associated with the brake pedal and a hydraulic receiver cylinder comprising at least one piston capable of displacing the inlet element of the pneumatic control valve. The receiver cylinder comprises a housing provided with a bore, at least one piston slidable in the bore and an abutment for restricting travel of the piston towards the inlet control element of the control valve.

6 Claims, 2 Drawing Figures

CONTROL DEVICE FOR A PNEUMATIC BRAKING SYSTEM

This is a continuation of application Ser. No. 665,368, filed Mar. 10, 1976, and now abandoned.

The invention relates to a control device for a pneumatic brake system, more particularly for use in heavy vehicles.

Pneumatic brake circuits for heavy vehicles usually have a large control valve, for example of the type described in U.S. Pat. No. 3,266,850, of which the input element is displaced by means of a pedal situated in the driver's cab and connected to the said element by a mechanical rod system. At present, a large number of heavy vehicles have tilting cabs to facilitate access to the engine of the vehicle so that it is not easy to use a system of rods between the brake pedal, attached to the tilting portion of the cab, and the pneumatic control valve, which in view of its importance is connected to the fixed chassis of the vehicle.

According to the invention, a control device of the hydraulic type is provided between the brake pedal and the pneumatic valve, the device comprising a master cylinder associated with the brake pedal and a hydraulic receiver cylinder comprising at least one piston capable of displacing the input element of the pneumatic control valve.

According to a first embodiment of the invention, the hydraulic control circuit is dual.

According to another embodiment of the invention, the receiver cylinder comprises a housing provided with a bore, at least one piston slidable in the bore and abutment means for restricting travel of the piston towards the input element of the pneumatic valve, thus preventing damage to the valve.

Figure 1:
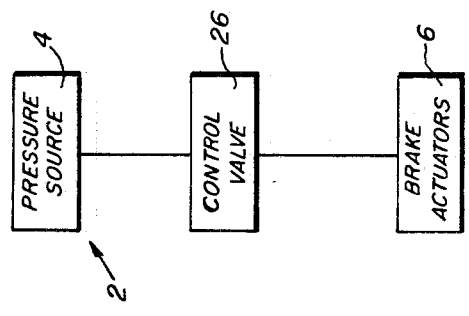
FIG. 1 is a schematic illustration of a pneumatic braking system.

Referring now to FIG. 1, a pneumatic braking system generally indicated by the numeral 2 includes a pressure source 4, brake actuators 6, and a control valve generally indicated by the numeral 26 which controls communication between the pressure source 4 and the brake actuators 6.

Figure 2:
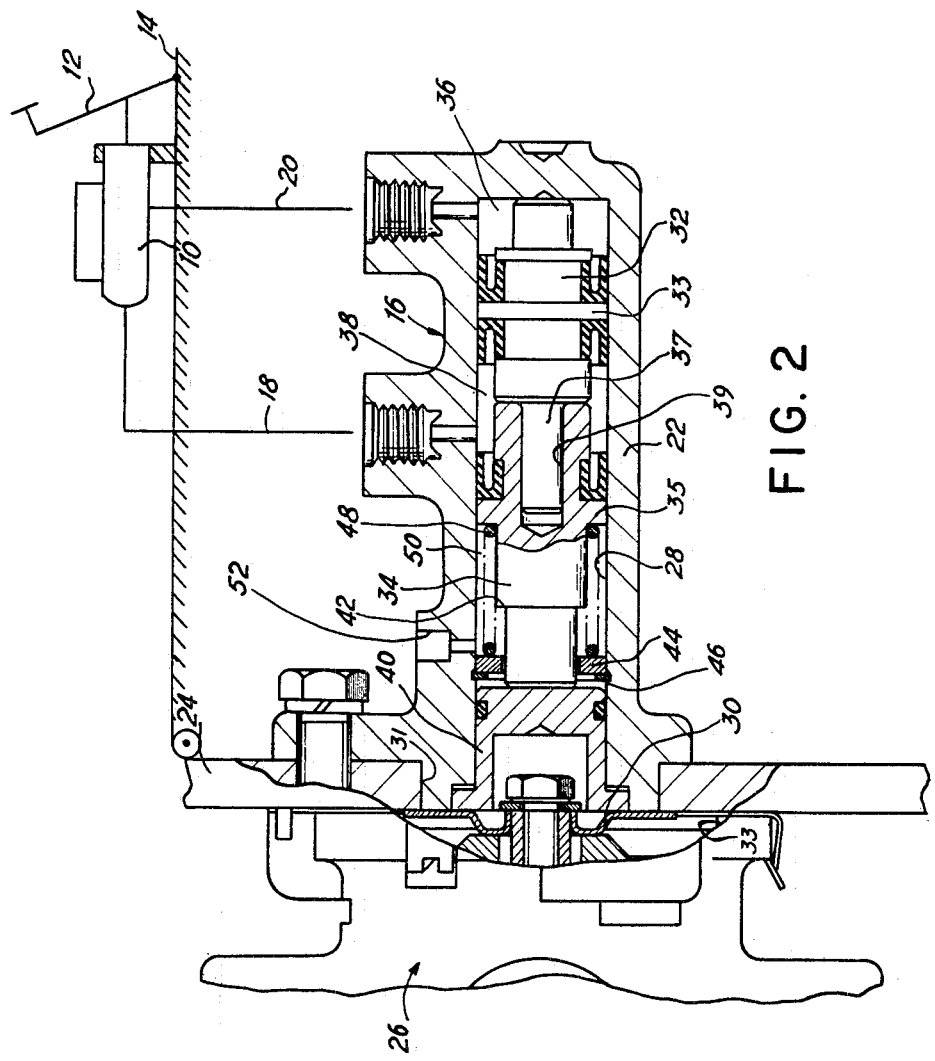
FIG. 2 is a diagrammatic illustration of a control device for actuating the brake valve illustrated in FIG. 1.

Referring to FIG. 2, a system for actuating the valve 26 includes a tandem brake master cylinder 10 of any known type is controlled by a brake pedal 12 pivoted on a support 14 attached to the tilting portion of the vehicle's cab. The master cylinder 10 is also attached to the support 14 and communicates with a dual hydraulic receiver cylinder 16 by way of two flexible hoses 18, 20. The receiver 16 has a housing 22 mounted on a frame 24 fixed to the chassis of the vehicle and also carrying a pneumatic brake valve 26 (of which only part is shown in the Figure) of the type described in U.S. Pat. No. 3,266,850. The receiver cylinder has a principal bore 28 coaxial with the axis of motion of the input control element 30 of the pneumatic brake valve. The bore 28 contains two floating pistons 32, 34, which define two chambers 36, 38 connected to the hoses 20, 18 respectively.

To save space and to reduce the length of the receiver cylinder, the pistons cooperate with the wall of the bore by means of single respective bearing surfaces 33, 35. They are located axially by virtue of being telescopically connected, a projection 37 on the piston 32 being slidable in a well 39 in the piston 34. The piston 34 adjoins the inlet control element 30 and moves it by way of a bell 40 slidable in a fluid-tight manner in the open end of the bore 28. To limit travel of the piston 34 outwards from the bore, thus preventing damage to the pneumatic brake valve, the piston 34 bears a step 42 capable of bearing on a thrust washer 44, which is urged on to a circlip 46 by a spring 48 situated between the washer 44 and the piston 34. The cavity 50 containing the spring 48 is connected to the atmosphere by a venting port 52. The pneumatic valve 26 is consequently protected from any fluid leaking from the hydraulic control device.

The various components of the hydraulic braking control are shown in their idle positions, in which the spring 48 urges both pistons to the right in the Figure until the piston 32 abuts on the blind end of the bore 28.

The master cylinder 10, hoses 18, 20 and receiver cylinder thus define a hydraulic control device for the pneumatic brake valve. The frame 24 fixed to the vehicle chassis and the brake valve 26 define aligned apertures 31, 33 through which the input control element 30 and housing 22 extend. Because the hoses 18, 20 are flexible, the cab of the vehicle can be tilted without risk of damage to or failure of the control device.

MODE OF OPERATION

When a brake application is effected, the vehicle operator operates the brake pedal 12 in the normal manner to generate braking pressure in both hydraulic systems served by the tandem master cylinder 10. The pressure generated by the master cylinder 10 is communicated through the flexible hoses 18 and 20 into the chambers 36 and 38, respectively. Fluid pressure in the chambers 36, 38 urges the pistons 32, 34 to the left viewing FIG. 2. Movement of the pistons is transmitted through the member 40 to actuate the control valve 26, thereby initiating communication between the pressure source 4 and the brake actuators 6 in the normal manner.

What I claim is:

1. In a vehicle having a fixed chassis and a cab capable of a pivotal movement relative to the chassis, a braking system including:
    a pneumatic pressure source;
    brake actuators responsive to fluid pressure from said pressure source to effect a brake application;
    a pneumatic control valve having a housing suitably connected to said chassis, said housing and said chassis defining aligned apertures through which extends an input control element of the control valve, said control element being movable along an axis substantially perpendicular to said apertures for controlling communication between said pneumatic pressure source and said brake actuators; and
    means for actuating said control valve including a master cylinder mounted on said cab, a hydraulic receiver cylinder having a housing suitably connected to said chassis and defining a blind bore therewithin substantially coaxial with the axis of motion of the input control element, an open end of said blind bore facing said apertures, piston means being slidably mounted in said blind bore and cooperating with the input control element of the pneumatic control valve to actuate the latter on pressurization of at least one fluid-receiving chamber defined between the piston means and the wall of the bore, and conduit means communicating the master cylinder with the fluid receiving chamber to pressurize the latter upon actuation of the master cylinder said conduit means being flexible to accommodate the pivotal movement of the cab relative to the chassis.

2. In a vehicle having a chassis and a cab pivotally mounted on said chassis, a braking system including a pneumatic pressure source, brake actuators responsive to fluid pressure from said pressure source to effect a brake application, a control valve mounted on said chassis for controlling communication between said pneumatic pressure source and said brake actuators, and means for actuating said control valve including a hydraulic master cylinder mounted on said cab, a hydraulic receiver cylinder mounted on said chassis and operatively connected to said control valve, said receiver cylinder including a housing defining a bore therewithin, piston means slidably mounted in said bore, said piston means cooperating with the wall of said bore to define a fluid-receiving chamber therebetween, means interconnecting the piston means and the control valve to transmit movement of the piston means to the control valve so that movement of the piston means actuates the control valve, and flexible conduit means communicating said master cylinder with said chamber, said flexible conduit means accommodating the pivotal movement between the cab and the chassis, said master cylinder being a tandem unit generating first and second hydraulic pressures, said piston means including first and second pistons dividing said chamber into a first compartment defined between said first and second pistons and a second compartment defined between an end of said second piston and an end of said bore, said flexible conduit means including a pair of flexible hoses, each of said hoses communicating one of the first and second fluid pressures generated by the master cylinder to a corresponding one of said first and second compartments, said interconnecting means including a bell slidable in said bore and located between said first piston and said control valve, and a venting port in the wall of said bore venting the cavity defined between the bell and said first piston.

3. The invention of claim 2:
and abutment means carried by said first piston and the wall of the bore for restricting travel of said first piston toward the control valve.

4. The invention of claim 3:
said abutment means comprising a step defined on said first piston and a shoulder fixed with respect to said bore for engagement with said step.

5. The invention of claim 2:
each of said pistons having a single bearing surface slidably engaging the wall of said bore, and means defining a telescoping connection between said pistons.

6. The invention of claim 5:
said telescoping connection defining means including a bore defined in one of said pistons and a projection extending from the other piston slidably received in the bore defined in said one piston.

* * * * *